United States Patent [19]

Sherer et al.

[11] Patent Number: 5,568,469
[45] Date of Patent: Oct. 22, 1996

[54] METHOD AND APPARATUS FOR CONTROLLING LATENCY AND JITTER IN A LOCAL AREA NETWORK WHICH USES A CSMA/CD PROTOCOL

[75] Inventors: William P. Sherer, Sunnyvale; Lai-Chin Lo, Campbell, both of Calif.; John F. Hickey, Killenaule, Northern Ireland

[73] Assignee: 3COM Corporation, Santa Clara, Calif.

[21] Appl. No.: 313,674

[22] Filed: Sep. 27, 1994

[51] Int. Cl.⁶ .................................................. H04J 3/02
[52] U.S. Cl. ........................ 370/17; 370/79; 370/85.3; 370/85.6; 370/85.13; 370/94.3
[58] Field of Search ............................... 370/17, 44, 48, 370/79, 85.2, 85.3, 85.6, 85.13, 93, 94.3, 94.1, 105.3, 85.1; 340/825.5, 825.51; 364/240.8, 241.2, 241.4, 241.5

[56] References Cited

U.S. PATENT DOCUMENTS

| | | | |
|---|---|---|---|
| 5,319,641 | 6/1994 | Fridrich et al. | 370/85.3 |
| 5,343,473 | 8/1994 | Cidon et al. | 370/85.6 |
| 5,351,241 | 9/1994 | Yehonatan | 370/85.3 |
| 5,353,287 | 10/1994 | Kuddes et al. | 370/85.3 |
| 5,355,375 | 10/1994 | Christensen | 370/85.3 |

*Primary Examiner*—Alpus H. Hsu
*Assistant Examiner*—Ricky Q. Ngo
*Attorney, Agent, or Firm*—Townsend and Townsend and Crew; Kenneth R. Allen; Stephen J. LeBlanc

[57] ABSTRACT

An Ethernet network or other CSMA/CD network includes hub adaptors that are modified to provide a known bounded low maximum access latency. The modified adaptors maintain a state variable whose values indicates whether the last operation by the adaptor was a transmit or a receive. In the case where the last operation was a receive, the adaptor transmits a packet with a minimum or zero backoff and as an option with a reduced interpacket gap. In the case where the last operation was a transmit, the adaptor waits before transmitting a packet a period of time that allows the other node on the channel to transmit a packet if the other node has a packet to transmit.

14 Claims, 5 Drawing Sheets

METHOD AND APPARATUS FOR CONTROLLING LATENCY AND JITTER IN A LOCAL AREA NETWORK WHICH USES A CSMA/CD PROTOCOL

BACKGROUND OF THE INVENTION

Figure 1:
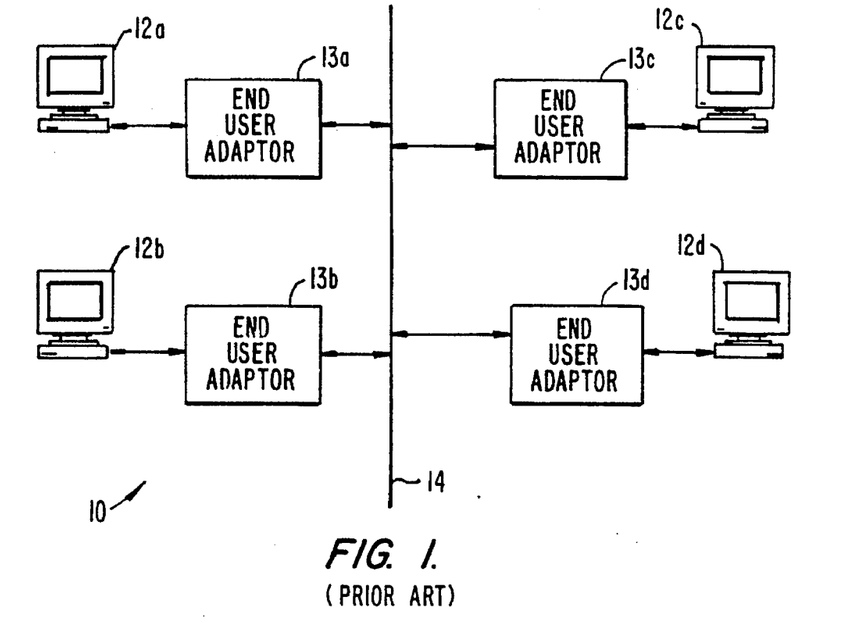
FIG. 1 is a diagram of a conventional (prior art) Ethernet network having a bus topology.

This invention relates to transmission of information between two or more digital devices in a network. More particularly, this invention relates to a method and apparatus for reducing latency and jitter in a CSMA/CD (Carrier Sense Multiple Access with Collision Detection) network.
Standard 802.3 Ethernet CSMA/CD networks, including those using the well-known Ethernet protocol, are local area networks (LANs) conforming to IEEE Standard 802.3 for linking multiple stations to a physical communications channel. As originally conceived and implemented, a standard Ethernet network allowed a number of stations (also referred to as "nodes" or data terminal equipment (DTE)) to each be directly connected to a single communication channel. FIG. 1 depicts a LAN 10 having four stations 12 a–d and a physical communication channel 14. Although the depicted stations 12 are shown as personal computer workstations, a station may be any digital device such as a computer peripheral, a digital telephone, or a teleconference terminal. The stations 12 are connected to the communication channel 14 through adaptors 13 a–d. The adaptors 13 are specialized circuits that handle transmissions on the network. The communication channel 14 may be an unshielded twisted pair Wire (UTP), a shielded twisted pair wire, a coaxial cable, a fiber optic cable or another medium capable of carrying a digital signal. Unshielded twisted pair wire is the conventional wiring in buildings for telephone systems, and thus, it is a convenient communication channel.

According to standard Ethernet protocol, peer-to-peer communication among stations is supported without the intervention of a central controller for the network. To access the network under the CSMA/CD standard, an adaptor 13 connected to a station 12 first listens to the communication channel (carrier-sense) to determine whether or not another station is transmitting. If the channel is quiet, then the adaptor 13 transmits a packet of data on the communication channel 14.

Occasionally, two or more station adaptors will listen to the channel at or near the same time, will detect silence, and then will attempt to transmit at the same time, resulting in a garbled transmission referred to as a "collision". A receiving station adaptor ignores the garbled transmission, while a transmitting station adaptor ceases transmission once it detects the collision. After a collision, each transmitting adaptor that detected the collision waits a period of time, known as "back-off", before attempting to retransmit. The back-off time, is measured in a discrete unit defined by a network parameter known as the "slot time." To reduce the chances of a repeated collision, each adaptor generates a random integer which determines the number of slot times that it will wait for back-off. In standard Ethernet, this integer is determined by an algorithm known as "truncated binary exponential backoff." The truncated binary exponential backoff algorithm takes into account the fact that when traffic on the Ethernet channel is heavy, a transmitting station may make a number of unsuccessful attempts to transmit a particular packet. According to the algorithm, the maximum possible backoff is doubled each time an attempt is made to transmit a particular packet. On the first attempt after a collision, the random integer picked by each transmitting station that detected a collision is either 0 or 1, on the second attempt it is between 0 and 3 inclusive, on the third attempt it is between 0 and 7, and so on. Once the backoff time has elapsed, a transmitter listens for a carrier and transmits as soon as there is no carrier on the channel.

Standard Ethernet adaptors are programmed to make a finite number of attempts to transmit a particular packet before discarding that packet and alerting their station that the packet has been discarded. For standard Ethernet, the predetermined maximum attempt limit is sixteen.

Standard Ethernet also defines a time period known as the "interpacket gap" (IPG). The IPG is an interval that a transmitter must wait between when it senses that a channel is silent and when it transmits a packet or between its own back-to-back packet transmissions. In standard 10 Mbps Ethernet, the IPG is a constant equalling approximately 9.6 microseconds.

A key advantage to CSMA/CD is that access to the communication channel typically is very fast because, under the protocol, a station may transmit as soon as it determines the channel is quiet. However, as traffic along the network increases, the number of collisions increase. Under heavy traffic conditions, the overhead time spent responding to collisions and retransmitting causes performance to deteriorate. Such overhead reduces the effective amount of network bandwidth available for successful transmissions.

Important performance characteristics of a CSMA/CDA network include "latency" and "jitter." Latency is defined as the amount of time it takes a station wishing to transmit a packet to complete the transmission of the packet or to discard the packet after the maximum number of attempts. In a typical standard Ethernet system, the maximum latency may be on the order of several seconds. The minimum latency is the time it takes the station to transmit a packet when there is no other traffic on the channel and when no collision occurs.

Figure 2:
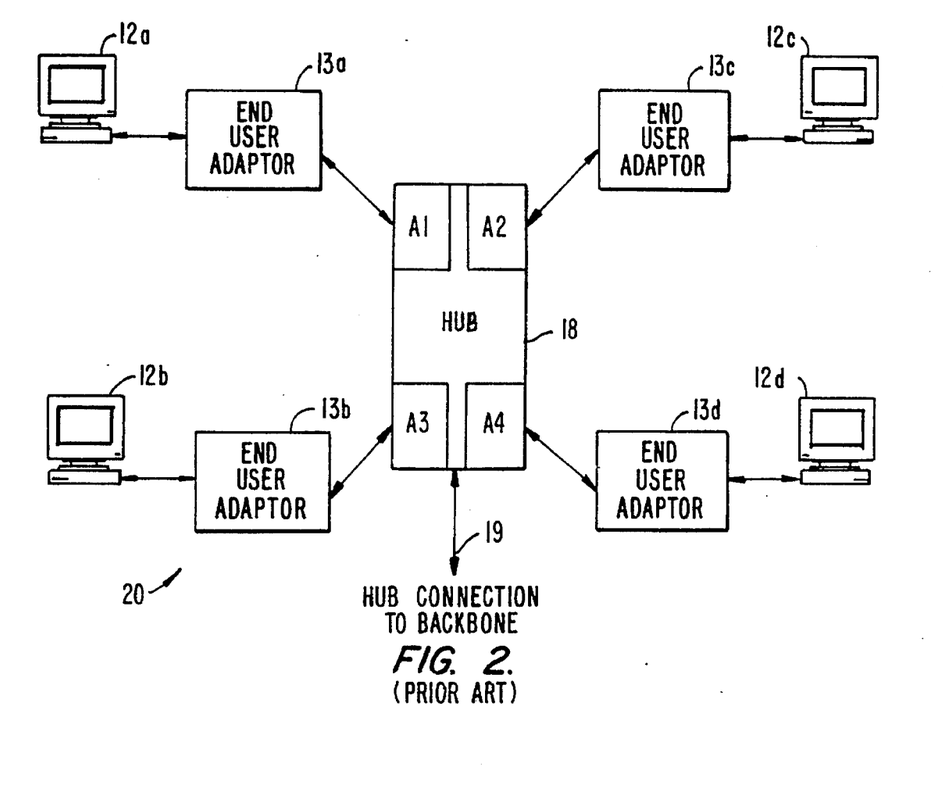
FIG. 2 is a diagram of a conventional (prior art) point-to-point Ethernet network having a star topology.

Jitter represents the uncertainty in the latency, or, in other words, is the difference between the minimum latency and the maximum latency.
Point-to-Point Ethernet One prior art modification made to the Ethernet network to improve transmission performance and reduce the network bandwidth consumed by collisions is point-m-point (PTP) Ethernet. A PTP Ethernet configuration is shown in FIG. 2. FIG. 2 shows a cluster 20 of stations 12 each connected through an adaptor 13 to a hub 18. The hub 18 contains a number of separate hub adaptors A1–A4, with each adaptor connected to just one station 12. The hub 18 may have a connection 19 to a network backbone which connects together a number of clusters into a single network. In contrast to standard Ethernet, in point-to-point Ethernet there are only two possible nodes on any one physical channel. The connections at the hub to separate communication channels are commonly referred to as "parts." Hub 18 as shown has four parts.

In PTP Ethernet, collisions are reduced because the number of possible transmitters on any one physical communication medium is only two. Collisions are not eliminated, however, because at any given instant, both a station and its hub adaptor may attempt to transmit over the communication media. In prior an PTP Ethernet networks, collisions are detected and responded to as they are in standard Ethernet. If a hub and station collide, each waits a random amount of time according to the truncated binary exponential backoff algorithm before attempting to transmit again. There currently exists a very large installed base of stations with standard Ethernet adaptors. Therefore, maintaining standard Ethernet protocol in PTP Ethernet can be an important design feature because it allows use of stations with network adaptors designed for original Ethernet on the new PTP connections. With PTP Ethernet, network performance may be greatly improved by adding a hub and changing the LAN configuration to that shown in FIG. 2 while making no changes in the station adaptors.

The PTP Ethernet configuration has proven effective for a number of LAN applications. However, as the frontiers of digital and multimedia communication have pushed ever outward, drawbacks and limitations of PTP Ethernet have emerged. In particular, PTP Ethernet has proven inadequate to handle multi-media real-time interactive audio and video due to the potentially long latency periods that will be experienced by one or both of the nodes when both nodes are trying to transmit long multiple packets. The potentially long access latency is due in pan to an inherent "unfairness" in the truncated binary exponential backoff algorithm. When two stations are operating on a channel according to the algorithm, it will be found that a packet's chances of successfully being transmitted decrease each time that packet experiences a collision. This is because after an initial collision, one of the two stations will eventually win and will successfully transmit its packet. That winning station will then send out its next packet without waiting any backoff period. Meanwhile, the initially losing station will continue to increase the range from which it picks its backoff according to the algorithm each time it experiences a collision on that packet. Under heavy load conditions, a relatively large number of packets will be discarded. This is not tolerable in a real-time multimedia system where acceptable performance requires a known, bounded, low maximum latency.

What is needed is a networking system and method that can operate with the large installed base of Ethernet-compatible stations but that can reduce jitter and provide a bounded low access latency so as to be useful in handling multi-media data.

SUMMARY OF THE INVENTION

The present invention provides a means for transmitting data packets in a CSMA/CD network with a guaranteed bounded low access latency and minimum jitter. The present invention allows effective transmission of multi-media data over an Ethernet-type network without any modification to existing Ethernet end-systems or end-system adaptors.

In brief, the present invention may be implement in the media access controllers (MACs) in a PTP hub. The MACs according to the invention store a state variable in order to determine whether the last operation they performed on their communication segment was a TRANSMIT or a RECEIVE. If the last operation was a TRANSMIT, the MAC will wait a time period long enough to allow a standard 802.3 station adaptor to transmit a packet if the station has a packet to transmit. If the last operation was a RECEIVE, the MAC will reduce its own backoff time to zero regardless of any collisions that it has experienced on that packet. Thus, when both the hub and station have a large number of packets to transmit on a segment, the hub MAC according to the invention ensures that access on the channel will be "fair," with the hub and station each taking turns in transmitting packets. This "fairness" is important in multi-media applications. The present invention can ensure this fairness while requiring no modification to existing 802.3 Ethernet station adaptors thus allowing owners of existing Ethernet equipment to implement a multi-media enabled network with a minimum investment in new equipment.

In one specific embodiment, a hub adaptor built according to the invention also adjusts its IPG based on the state of previous transactions on the channel.

A hub adaptor built according to the invention provides superior performance over standard PTP Ethernet with respect to parameters considered most crucial for multimedia applications, which require fair access with a low bounded latency on both ends of the channel even during heavy traffic conditions. A commonly used multimedia scenario to measure network performance is to measure fairness and latency with all stations constantly offering full load (an overload scenario). Under this test, standard Ethernet protocols perform poorly because the test highlights standard Ethernet's low efficiency and unfairness under very heavy traffic conditions.

With a hub built according to the invention and connected to standard 10BaseT adaptor cards in the stations, the invention can guarantee an access latency orders of magnitude lower than a standard Ethernet hub can guarantee. Furthermore, the number of packets discarded due to maximum attempts is also orders of magnitude lower.

As an example, a simulation of 10,000 seconds of operation was run comparing a hub adaptor according to the invention to a standard Ethernet hub adaptor. The hub is assumed to be PTP in both cases and a standard 802.3 10BaseT adaptor is used in the station. Both ends of the channel constantly offered a full load of maximum sized packets. In this scenario a "perfect" access latency would be 1.23 ms. A summary of results is shown in Table 1.

TABLE 1

|  | HUB adaptor built according to the invention connected to standard adaptor. | Standard adaptor connected to standard adaptor. |
| --- | --- | --- |
| Average Access Latency | 1.26 ms | 4.31 ms |
| Maximum Access Latency |  |  |
| excluding transmission failures | 1.68 ms | 367. ms |
| including transmission failures | 2.60 ms | 2,569. ms |
| Packets Successfully Transmitted | 8,015,204 pkts | 8,040,230 pkts |
| Transmission Failures (after maximum attempts) | 132 pkts | 51,378 pkts |

However, forcing low access latency creates a 35 microsecond overhead per packet in this overload case due to the high collision rate. Using the same overload scenario and assuming minimum packet size, then packets per second are reduced to 66% that of standard Ethernet. If it is assumed that the average packet is about 500 bytes, then about 95% of the packet rate of standard Ethernet is provided by the invention at very low latency. Standard Ethernet can only maintain this level of relative efficiency with an infinite queue of packets. With normal traffic patterns, i.e., no assuming a maximum load of packets to send on both ends of the channel, any performance cost of guaranteeing low latency according to the invention would be minimal and many scenarios exist where total throughput is improved.

For the sake of clarity, the following description assumes that an adaptor built according to the invention is located in a hub and is in communication with a standard 8023 adaptor located in a station. However, the method of the invention is not limited to the particular configurations or hardware described herein and may be implemented by modifying the adaptors in the stations of a network or may be implemented between any two devices communicating via a CSMA/CD channel.

DETAILED DESCRIPTION OF PREFERRED EMBODIMENTS

Figure 3:
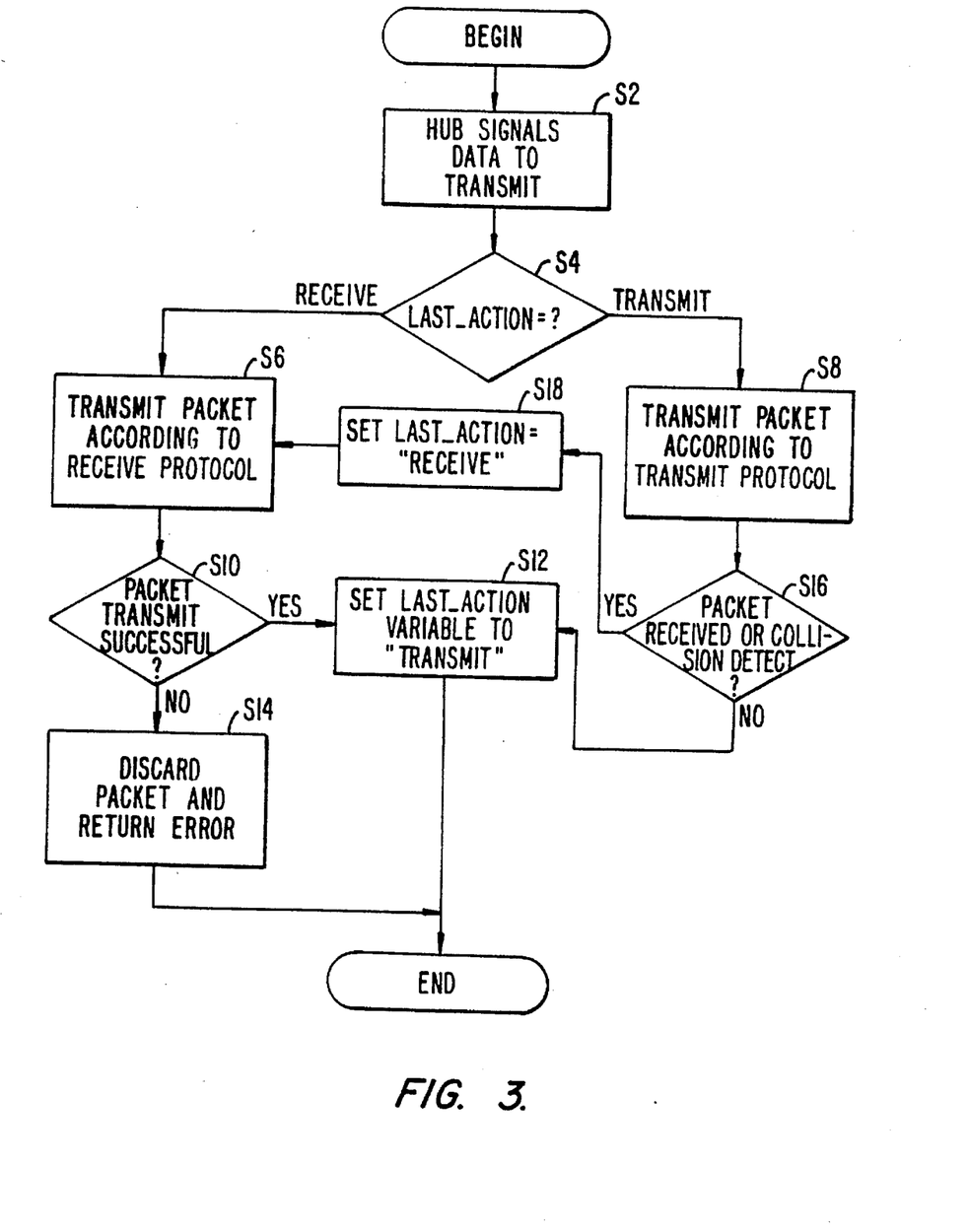
FIG. 3 is a flowchart of the transmission of a packet according to the invention.
Figure 4:
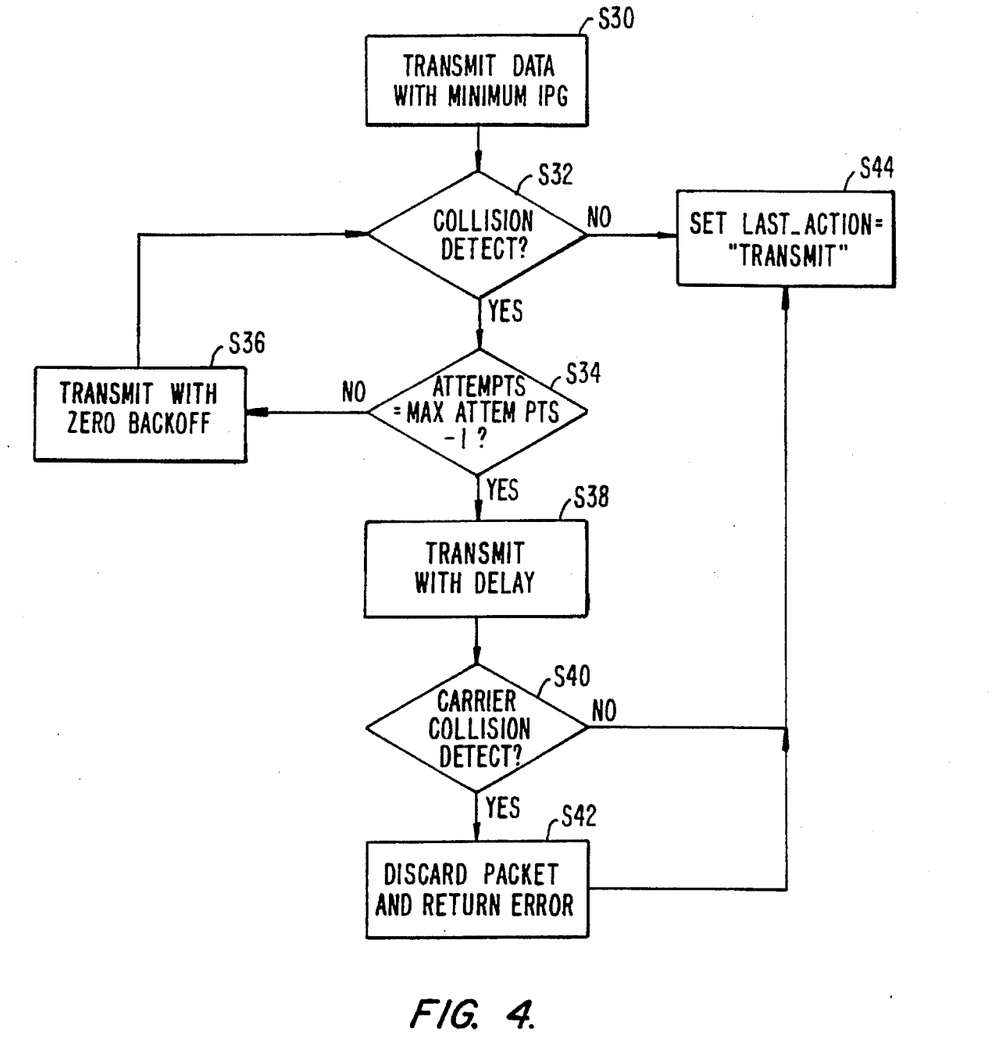
FIG. 4 is a flowchart of the transmission of a packet when the last action was a receive according to the invention.
Figure 5:
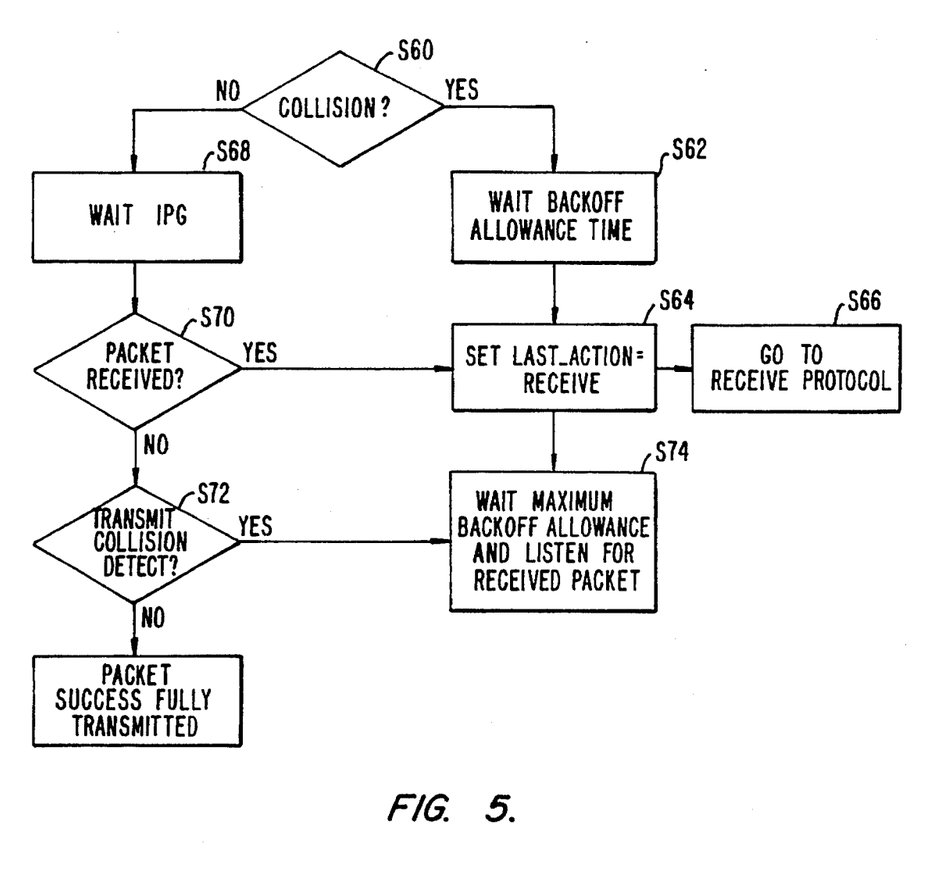
FIG. 5 is a flowchart of the transmission of a packet when the last action was a transmit according to the invention.

Operation of an adaptor built according to the invention is illustrated in the flow-charts shown in FIGS. 3, 4, and 5.

Transmission of a packet according to the invention occurs as follows. Referring to FIG. 3, the process of transmitting a packet begins when the hub signals the hub adaptor that is has data to transmit (Step S2). The hub adaptor then checks the value of a state variable to determine if the last action it performed on the channel was a TRANSMIT or a RECEIVE (Step S4). If the last action was a RECEIVE, the adaptor attempts to transmit the packet according to a Last_Action=RECEIVE protocol (Step S6). According to the Last_Action =RECEIVE protocol, the method of the invention favors transmission of a packet from the hub to the station by providing that the hub will wait a minimum time before transmitting a packet. If the Last_Action was a TRANSMIT, the adaptor attempts to transmit the packet according to a Last_Action =TRANSMIT protocol (Step S8). According to the Last_Action =TRANSMIT protocol, the method of the invention favors transmission of a packet from the station to the hub by providing that the hub will wait at least the station's maximum backoff time before transmitting a second packet. If the Last_Action=RECEIVE transmission was successful (Step S10), then the adaptor resets the state variable to TRANSMIT (Step S12) and transmission ends. If the Last_Action= RECEIVE transmission failed then the adaptor discards the packet and returns an error to the hub (Step S14).

If the Last_Action=TRANSMIT, the hub adaptor will defer transmitting a packet if the station has a packet to transmit. The hub waits an interpacket gap time before transmitting to allow the station to transmit a packet. If a packet is received on the channel during that time or if a collision is detected (Step S16), the hub adaptor will receive the packet from the station or wait the backoff allowance time and then reset its state variable to RECEIVE (Step S18) and proceeds to transmit the packet according to a Last_Action=RECEIVE protocol (Step S6). If no packet is received on the channel and no collision is detected, the packet is transmitted according to a Last_Action=TRANSMIT protocol, the adaptor maintains the state variable at TRANSMIT, and transmission ends (Step S12).

FIG. 4 is a flowchart of the steps taken by the adaptor if the state variable Last_Action examined in step S4 has a value of "RECEIVE." If the last action was a RECEIVE, the adaptor transmits the packet with zero backoff, even if a collision was previously detected on that packet (Step S30). If a collision is detected (Step S32), the adaptor will retry the transmission again with zero backoff (Step S36) a number of times until the attempt limit expires (Step S34). If the station adaptor is working properly, multiple collisions will occur only if the station adaptor repeatedly picks zero when generating random numbers for backoff according the truncated binary exponential algorithm. On the last attempt, the hub adaptor will delay the transmission slightly (in one embodiment approximately ½ slot time) in order to sense if the other adaptor is transmitting with a backoff of zero (Step S38). If a collision is detected after this delayed transmission (Step S40), an error is signalled and the packet is discarded (Step S42). This delay effectively cuts the maximum worse-case backoff at the station adaptor in half by preventing the station from having to make the last backoff selection. Once a transmission has been successfully completed or the packet has been discarded the adaptor resets its state variable to TRANSMIT (Step S44).

This just described operation of the invention limits the maximum access latency compared to a standard Ethernet adaptor. For the steps just described, the maximum access latency equals the maximum allowed number of attempts (which in one specific embodiment of the invention is set to seven) times an overall latency factor which equals some inherent system access delays plus the maximum possible backoff value of each attempt. In the process just described when the Last_Action=RECEIVE, the backoff value is held at zero by the hub adaptor even after multiple collisions. In a standard Ethernet, the maximum latency would be 16 times the sum of the system access delays plus the sum of the maximum possible backoff values selectable at each of the 16 attempts.

FIG. 5 is a flowchart of the steps taken by the hub adaptor wishing to transmit a packet if the Last_Action variable examined is step S4 has a value of "TRANSMIT." If the last action was a TRANSMIT, the hub adaptor has effectively transmitted a packet and, according to the invention, it then waits before it attempts to send another packet in order to allow the station adaptor to transmit a packet. The amount of time the hub waits before transmitting a packet depends on the number of collisions the hub has experienced since the last packet was received from the station. If there was a collision during the hub adaptor's attempts to transmit the last packet (Step S60), the hub adaptor waits until it receives a packet from the station adaptor or until the maximum backoff period which the station adaptor could have used has expired (Step S62). The hub calculates the maximum backoff period which the station adaptor could have used by keeping count of the number of collisions it has experienced since the last packet was received from the station and using the truncated binary exponential backoff algorithm. Therefore, the station adaptor is guaranteed at least one opportunity to send a collided-with packet before a packet is again sent by the hub adaptor. Once the hub adaptor has waited a backoff allowance time, even if a packet has not been received, the hub resets its Last_Action variable to RECEIVE and then transmits with the protocol outlined in FIG. 3.

Figure 6:
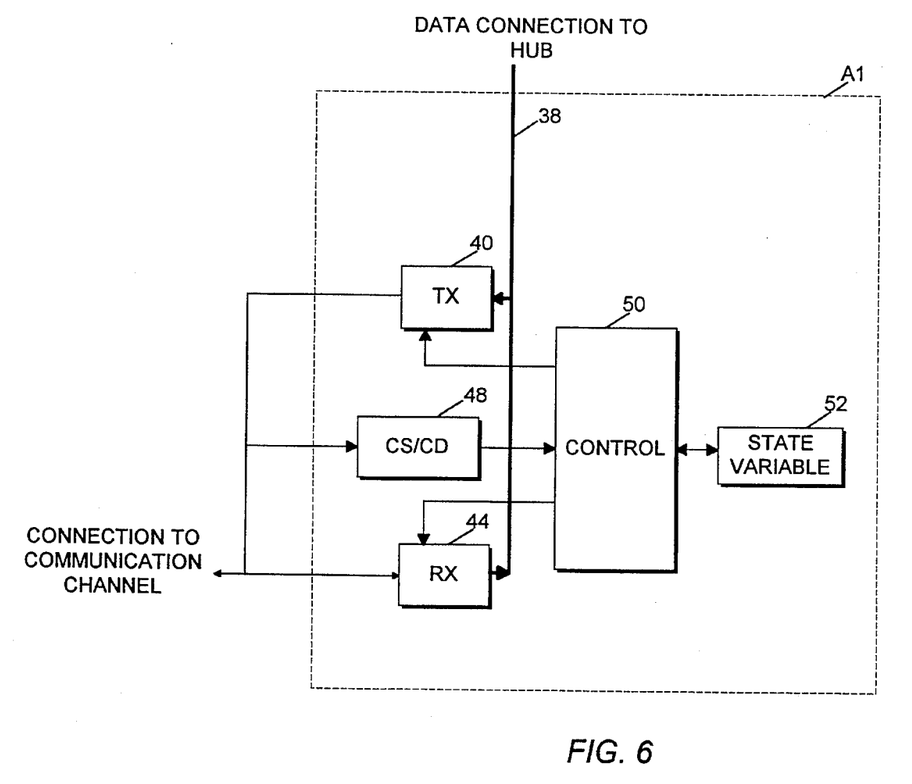
FIG. 6 is a block diagram showing an improved hub adaptor according to the invention.

If no packet has been received from the station and there was no collision, the hub adaptor waits an interpacket gap (Step S68) before transmitting the back-to-back packet in accordance with standard Ethernet. If a packet is received (Step S70), the hub adaptor accepts the packet and changes the value of Last_Action to RECEIVE and then proceeds to transmit according to the steps shown in FIG. 4. If a packet is not received during this period, the adaptor transmits the packet while listening for a collision (Step S72). If a collision is detected, the adaptor will stop attempting to transmit and will wait for the new maximum backup period of the station adaptor (Step S74). Whether or not a packet is received during that time, the hub adaptor will change the value of Last_Action to RECEIVE and proceed according to the flow-chart of FIG. 4. FIG. 6 is a block diagram showing one possible embodiment of a hub adaptor according to the invention. An improved network according to the invention would resemble the network of FIG. 2, with one or more of hub adaptors A1–A4 replaced by the improved adaptor shown in FIG. 6. Shown in FIG. 6 is an adaptor having a data bus connection 38 to hub 18 for transferring data between the hub and the transmit and receive circuits, a data receive circuit 40 for receiving data from another node 13 on its communication channel, a data transmit circuit 44 for transmitting data to another node on the communication channel, a carrier sense/collision detect (CS/CD) circuit 48 for detecting when data on the receive portion of said channel is being received on the channel and for detecting collisions on the channel when data is being transmitted by adaptor A1, and a state variable 52 for storing the state of the last action performed on the communication channel by adaptor A1, i.e. whether the last action was a transmission by adaptor A1 or a reception at adaptor A1, and a controller responsive to the state of state variable 52 and CS/CD circuit 48 for controlling transmitter 40 and receiver 44.

Extending the IPG

According to one embodiment of the invention, when the hub adaptor wishes to transmit back-to-back packets, it will extend the interpacket gap (IPG) of standard Ethernet to assure that the station adaptor has an opportunity to transmit and to reduce the likelihood of a collision. Extending the IPG allows the hub a chance to detect a packet being transmitted by the station and to accept that packet rather than colliding with it.

However, always extending the IPG when Last Operation=TRANSMIT is not always useful. In a further embodiment of the invention, efficiency is increased by only extending the IPG when a transmission from the station adaptor is probable. By considering the bursty nature of a lot of network traffic one can observe that whether a packet has recently been received is a reasonable predictor of whether a packet will be received soon. In one embodiment of the invention, control of IPG extension is implemented by a state variable which is set when Last Operation is set to RECEIVE or when there has been a collision and is reset when a timer (in one embodiment 15 microseconds) expires after the end of a transmission. This embodiment attempts to cause the IPG to be extended only when needed to assure fair access at minimal overhead.

Modifying the attempt limit

The simulation mentioned in, connection with Table 1 assumed an attempt limit of six. The attempt limit determines the transmission failure rate due to maximum attempts. For the overload scenario, over long periods of time, this is given by the formula:

$$\text{Transmission failure rate} = \frac{1}{2}^{Do}$$

where $Do=((\text{maximum attempts})*(\text{maximum attempts}-1)/2)+1$. Applying this formula gives a transmission failure rate of 1 in 65,536 for maximum attempts of six and 1 in 4,194,304 for maximum attempts of seven.

The more general case rate which applies only to packets which actually incur a collision is while the Last Action state variable is "Receive":

$$\text{Transmission failure rate} = \frac{1}{2}^{Dg}$$

where $Dg=((\text{maximum attempts})*(\text{maximum attempts}-1)/2)$. Applying this formula gives a transmission failure rate of 1 in 32,768 for maximum attempts of six and 1 in 2,097,152 for maximum attempts of seven. In the worst case, this can only happen to half the packets. Therefore, the overload scenario defines the worst case transmission failure rate.

For latency, Self-contention is ignored and latency is measured from start of attempt to access. For 10 megabits in the overload scenario described above, the maximum latency ignoring transmission failures is determined by the formula:

$$\text{Maximum latency} = 2^{Lo}*51.2*10^{-6}$$

where Lo=maximum attempts −1. Applying this formula gives a maximum latency of about 1.7 ms for maximum attempts of six and about 3.3 ms for maximum attempts of seven.

In a general Case with varying packet sizes, another significant term in maximum access latency would include the maximum difference in packet size on a single pair of transmitted packets (size of packet sent by the work-station minus size of packet sent by the hub). Including this difference, the maximum latency ignoring transmission failures is determined by the formula:

$$\text{Maximum latency} = 2^{Lg}*51.2*10^{-6}+Pg*10^{-7}$$

where Lg=maximum attempts-1 and Pg=1454. Applying this formula gives a maximum latency of about 1.7 ms for maximum attempts of six and about 3.4 ms for maximum attempts of seven.

For all practical purposes, the latency induced by failing maximum attempts of six is bounded by 2.7 ms. In the overload scenario, two maximum attempt failures in a row occur at the rate of $\frac{1}{4}^D$ and would have a latency dominated by $2^{L+1}*51.2*10^{-6}$. However, with an attempt limit of six and minimum packet size, this will occur once about every 5 days of continuous operation, and for attempt limit seven this will occur once about every 55 years of continuous operation.

The average layer packet overhead is largely unchanged as the maximum attempt limit is increased past six. This means the performance relative to standard Ethernet remains almost identical. So the trade off is primarily between failure rate due to maximum attempts and maximum latency. An observation to make at this point is that the link bit error rate (BER) is specified at no worse than 1 error in $10^8$ bits. For maximum size packets this means that 1 packet in about 8,500 will be dropped due to CRC error; for 500 byte packets, that 1 packet in about 25,000 will be dropped; and for minimum size packets, that about 1 in 175,000 will be dropped. This shows that the worst case transmission failure rate with an attempt limit of six or seven creates the same order of transmission failure effects as the worst case bit error rate.

Matched adaptors

In another embodiment of the invention, both the hub adaptor and the station adaptor may be modified according to the invention. With this configuration, "perfect" usage of the link is possible. Each adaptor would maintain its access state and the two adaptors would share the link fairly on a packet-by-packet basis. A defined mechanism to recover from loss of state synchronization is necessary, but is easy to implement by, for example, having the maximum attempt limits differ by one.

Cheating on IPG

In another embodiment of the invention, rather than transmitting at minimum IPG when transmitting according to the Last_Action=RECEIVE protocol, a hub adaptor would transmit at less than the standard Ethernet IPG, further increasing the effective data bandwidth of the channel.

Time Slot method

In another embodiment of the invention, a hub built according to the invention would guarantee fairness on a time-period-by-time-period basis, rather than a packet-by-packet basis. According to this embodiment, a hub would transmit packets according to a Last_Action=; RECEIVE protocol favoring the hub for a set period of time, say 2 ms, and would then transmit packets according to a Last_Action=TRANSMIT protocol for a set period of time.

Multi-Priority Packets

In a further embodiment, data packets will contain information regarding their priority level in the network. This priority information may be explicitly included in the header of the data packet or may be determined implicitly from the packet's source or destination address. A hub adaptor built according to this embodiment of the invention will examine the packet priority of competing TRANSMIT and RECEIVE operations on a channel and will allow for repeated TRANSMIT or repeated RECEIVE operations when those operations are for higher priority packets than their competing operation. According to a further embodiment, a hub is enabled to determine the number of times a low priority packet is preempted by a higher priority packet and to halt preemption of the lower priority packet when a maximum allowable latency limit for that packet is reached.

The invention has now been explained with reference to specific embodiments. Other embodiments will be apparent to those of skill in the art. In particular, method steps have been grouped and labelled as being part of various sub-methods in order to increase clarity of the disclosure, however, these steps could be differently grouped without changing the essential operation of the invention. It is therefore not intended that this invention be limited, except as indicated by the appended claims.

What is claimed is:

1. In a carrier-sense/collision-detect network, a method for transferring data over a communication channel between a first node and a second node whereby said first node ensures fairness of access and low bounded maximum access latency, comprising the steps of:

forming the data into packets;

at said first node, detecting the state of a last action state variable;

if the last action variable indicates the last action performed by said first node was a receive action, transmitting a packet from said first node to said second node according to a last-action-equals-receive protocol such that said packet from said first node is given priority over a packet originating at said second node;

if the last action variable indicates the last action performed by said first node was a transmit action, transmitting a subsequently available packet from said first node to said second node according to a last-action-equals-transmit protocol such that transmissions from said first node are deferred if a packet from said second node is detected on said communication channel thereby giving priority to a packet originating at said second node; and setting said last action state variable to conform to the last action performed by said first node on said channel.

2. The method according to claim 1 further comprising the step of:

initiating a timer whenever said last action state variable indicates the last action at said first node was a transmit and resetting said last action state variable to receive whenever when said timer expires if there has been no traffic on said channel.

3. The method according to claim 1 wherein said last-action-equals-receive protocol comprises the steps of:

waiting a predetermined minimum interpacket gap time;

transmitting said packet from said first node while listening for a collision;

upon detection of a collision, repeating transmission of said packet with a backoff period of zero for a predetermined number of attempts;

at the last attempt of said predetermined number of attempts, delaying transmission of said packet so as to determine if said second node is transmitting with a backoff of zero;

if said second node is transmitting with a backoff period of zero, discarding said packet; and if no collision is detected on any one attempted transmission, completing transmission of said packet.

4. The method according to claim 1 wherein said last-action-equals-transmit protocol comprises the steps of:

determining whether said second node has experienced a collision in attempting to transmit said packet to said first node;

if said second node has experienced a collision, waiting a backoff allowance time substantially equal to the maximum possible backoff time of said second node and when said time expires or said packet is received from said second node, resetting said last action variable to receive and transmitting according to said last-action-equals-receive protocol;

if said second node has not experienced a collision, waiting an interpacket gap time before transmitting a packet;

if a packet is received at said first node during said interpacket gap time, resetting said last action variable to receive and transmitting according to said last-action-equals-receive protocol;

transmitting said packet from said first node to said second node; and if a collision occurs during transmission of said packet, waiting a backoff allowance time substantially equal to a maximum possible backoff time of said second node and upon expiration of said time or upon receipt of a packet from said second node, resetting said last action variable to receive and then transmitting packets according to said last-action-equals-receive protocol.

5. The method according to claim 1 wherein said last-action-equals-transmit protocol comprises the steps of:

transmitting the packet from said first node to said second node so long as no collision has occurred with a packet from said second node since the last time said second node successfully transmitted a packet; and if said second node has experienced a collision, waiting a backoff allowance time substantially equal to a maximum possible backoff time of said second node and when said time expires or a packet is received from said second node, resetting said last action variable to receive and transmitting according to said last-action-equals-receive protocol.

6. The method according to claim 1 further comprising the step of monitoring at said first node a number of collisions experienced by said second node when said second node is attempting to transmit a packet and using said number of collisions to determine a backoff allowance time.

7. The method according to claim 3 wherein said last-action-equals-receive protocol further comprises the step of reducing said predetermined minimum interpacket gap time.

8. The method according to claim 4 wherein said last-action-equals-transmit protocol further comprises the step of extending the interpacket gap between back-to-back packet transmissions.

9. The method according to claim 4 wherein said last-action-equals-transmit protocol further comprises the steps of:

setting an interpacket gap reduction timer when the last action variable is initially set to transmit; and upon expiration of said timer, reducing an interpacket gap time between back-to-back packet transmissions from said first node until a collision is detected or a packet is received at said first node.

10. The method according to claim 1 wherein:

said packets contain information indicating that said packets have one of at least two different levels of priority;

and further comprising the steps of:

at said first node, detecting the priority of a packet to be transmitted;

at said first node, detecting the priority of a packet being received;

at said first node, preempting an operation for a lower priority packet when a competing packet has a higher priority; and at said first node, halting preemption of a lower priority packet when a maximum allowable latency limit of said lower priority packet is reached.

11. In a carrier-sense/collision-detect network, a method for transferring data over a communication channel between a first node and a second node ensuring fairness of access and low bounded maximum access latency, comprising the steps of:

at said first node, detecting the state of a mode variable;

if the mode variable indicates the first node is in a transmit mode, transmitting data from said first node to said second node according to a last-action-equals-receive protocol such that said data from said first node is given priority over data originating at said second node;

if the mode variable indicates the first node is in a receive mode, transmitting data from said first node to said second node according to a last-action-equals-transmit protocol such that said first node defers data transmission when it detects data from said second node; and changing the value of mode variable from transmit to receive according to a predetermined timing schedule.

12. A network for the exchange of digital data comprising;

a first node having a plurality of first node adapters;

a plurality of second nodes, each having a second node adaptor and each connected to a first node adaptor by a private communication channel, wherein each said first node adaptor comprises:

means for receiving data from said first node for transmission on its connected communication channel to its connected second node;

means for transmitting said data on said channel;

means for detecting data on said channel from said second node;

means for receiving said data from said channel;

means for transferring said data to said first node;

means for detecting collisions on said channel while said first node adapter is transmitting on said channel;

state variable means for storing the state of the last action performed by said adaptor on said communications channel; and control means responsive to the state of said state variable means and said detecting means for controlling the transmitting of said data on said communications channel and the receiving of said packets from said channel.

13. The network according to claim 12 wherein said second node adaptor is a standard 802.3 CSMA/CD adaptor.

14. A method for enabling a plurality of 802.3 ethernet standard workstations to send and receive multi-media data and ensuring fairness of access and low bounded maximum access latency, comprising the steps of:

connecting said standard 802.3 workstations to a multi-media enabled hub via a plurality of private point-to-point transmission channels;

transmitting packet data between a first workstation and a second workstation by first transmitting a packet from said first workstation to said hub and then transmitting said packet from said hub to said second workstation; and using said hub to ensure low bounded access latency by said first node alternating its packet protocol such that said hub transmits a plurality of packets according to a protocol favoring said packets and then transmits a second plurality of packets according to a protocol such that said hub defers to any packets being sent by said workstations.

* * * * *